UNITED STATES PATENT OFFICE.

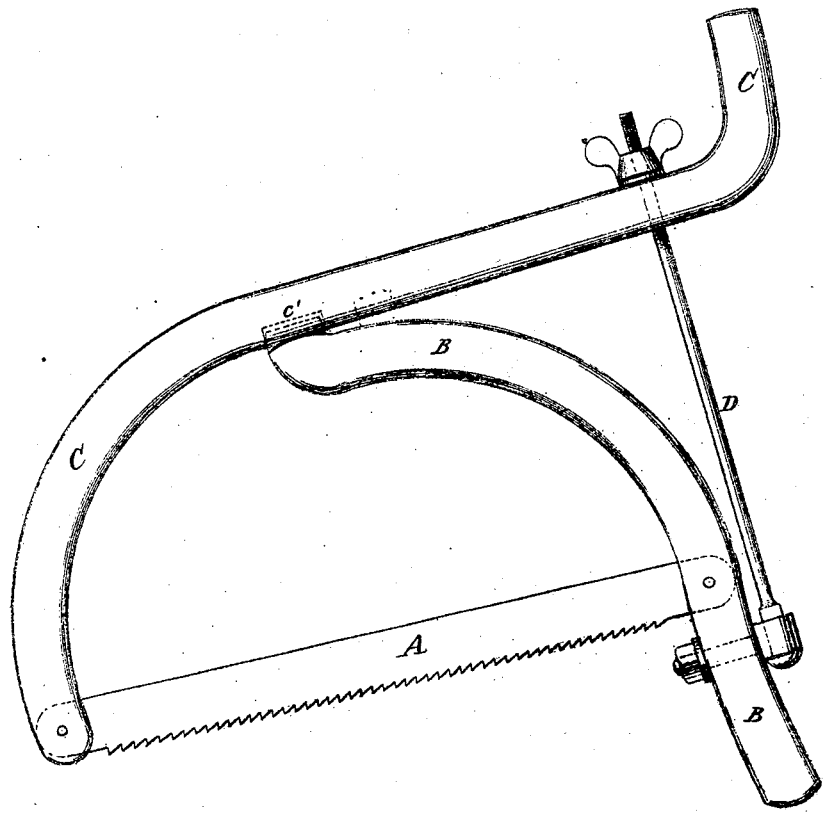

JOHN H. GRAHAM, OF BROOKLYN, NEW YORK.

IMPROVEMENT IN SAW-FRAMES.

Specification forming part of Letters Patent No. 117,769, dated August 8, 1871.

*To all whom it may concern:*

Be it known that I, JOHN H. GRAHAM, of Brooklyn, in the county of Kings and State of New York, have made certain Improvements in Saw-Frame; and I do hereby declare that the following is a clear and exact description of the same, reference being had to the accompanying drawing, which is a side view of my improved saw-frame.

The object of my invention is to furnish an improved saw-frame which shall be simple in construction, effective in use, holding the saw securely and firmly, and which may be packed compactly for storage or transportation; and it consists in dispensing with all brace-bars as a distinct element in a saw-frame by making the frame answer at the same time the purpose of a brace-bar, and at same time in arranging the tightening-rod at the side of and exterior to the frame of the saw, as hereinafter more fully described.

In the drawing illustrating my invention, A is the saw-blade of a buck-saw frame, the ends of which are inserted in mortises or slots cut in the arms or bars B C of the frame, and are secured in place by pins in the ordinary manner. The lower end of the bar B projects below the saw-blade A, to serve as one of the handles. The upper part of the bar B curves forward, and has a rounded or other convenient form of tenon made upon its end to enter a socket, c', in the lower edge of the bar C, at or near the middle. Several sockets, as at c' c', may be cut, in order that the bar C may be adjusted for saw-blades of different lengths. The lower part of the bar C is bent to the same curve as the upper part of the bar B, so that the bars B C may coincide with each other when packed for storage or transportation.

The upper end of the bar C is curved upward to serve as the other handle. D is the tightening or straightening-rod, placed at one side of the bar B, which may, in itself, be constructed in the ordinary manner.

In the drawing one end of the rod D is shown as passing through the bar C near its handle, and has a thumb-screw thereon for the purpose of retaining the strain placed upon the saw in tightening up, and the other end, made square, passes through a square hole in a lug bolted to the handle of the bar B, so as not to permit of the rod turning in the straining of the saw. If desired, the upper end of the bar B may project beyond the bar C, and the forward end of the saw-frame be provided with a tightening-rod in the same manner as the rear end of the said frame. In this case the bars B C, at their point of intersection, should be provided with a strengthening-plate or plates, which may serve as or a support to the fulcrums of the two bars.

These improvements may be applied to a butcher's bow-saw or to a turning or felly-web saw as well as to a buck-saw, and the side pieces may be constructed of metal of suitable temper instead of wood.

Having thus described my invention, I claim as new and desire to secure by Letters Patent—

The combination of two side bars B and C of a saw-frame with a tightening-rod placed exterior to and at the end of the saw-frame, substantially as shown and described.

JOHN H. GRAHAM.

Witnesses:
 WM. F. MCNAMARA,
 A. B. MALCOMSON, Jr.